Dec. 24, 1957 W. R. JOHNSON 2,817,701

REPRODUCER FOR RECORDED TELEVISION SIGNALS

Filed June 11, 1954

2 Sheets-Sheet 1

INVENTOR.
WAYNE R. JOHNSON
BY
Lippincott & Smith
ATTORNEYS

Dec. 24, 1957 W. R. JOHNSON 2,817,701

REPRODUCER FOR RECORDED TELEVISION SIGNALS

Filed June 11, 1954

2 Sheets-Sheet 2

INVENTOR.
WAYNE R. JOHNSON
BY
Lippincott & Smith
ATTORNEYS 2,817,701

REPRODUCER FOR RECORDED TELEVISION SIGNALS

Wayne R. Johnson, Los Angeles, Calif., assignor, by mesne assignments, to Minnesota Mining & Manufacturing Co., St. Paul, Minn., a corporation of Delaware Application June 11, 1954, Serial No. 436,189

6 Claims. (Cl. 178—6.6)

This invention relates to apparatus for reproducing television or like signals recorded on magnetic tape or by other quasi-phonographic methods. This constitutes a development and improvement on the inventions disclosed in the application of John T. Mullin, Serial No. 195,612, filed November 14, 1950, and entitled "System for Recording and Reproducing Television Signals," and on the copending application of the present inventor, Serial No. 272,083, entitled "Television Recording and Reproducing System" filed February 18, 1952, and applicant's granted Patents No. 2,694,748, entitled "Television Signal Reproducing System" and No. 2,695,331 entitled "System for Stabilizing Reproducers of Television Signals," granted November 16, 1954, and November 23, 1954, respectively.

Of the prior applications and patents above cited the present invention is related most closely to that disclosed in prior application Serial No. 272,083, in that it is designed for the decoding of signals recorded in the manner disclosed in that application and embodies a certain number of features in common with the reproducing equipment there shown.

In the last above mentioned application there is disclosed a method of recording and reproducing television or other signals containing frequency components so high as to render their direct recording and reproduction by quasi-phonographic methods unsatisfactory. To accomplish recordation in the manner there disclosed the signal to be recorded is sampled continuously for intervals of the order of magnitude of one-half cycle of the highest frequency which it is intended to record. Instead of being recorded on a single track a plurality of tracks are produced on a common recording medium, preferably a magnetic tape, and the successive samples are recorded in rotation upon successive tracks. With respect to the samples recorded on any one track, however, the polarity of successive samples is reversed. The parameters of the apparatus are such that the higher frequencies, corresponding to the extremely brief pulses represented by the samples, are removed, and the signals are therefore recorded as a plurality of modulated waves having a common carrier frequency but successively phase-retarded by equal increments, so that, considered collectively, crests of recorded waves (which may be either positive or negative) occur at substantially equal intervals throughout each period of the sampling cycle. The result is a plurality of parallel tracks each representing a modulated wave, the waves on all of the tracks having a common carrier frequency but relatively phase-displaced with respect to each other as described above.

In reproduction each of the waves so recorded is picked up by an individual transducer head. Preferably there is also recorded on the common medium an unmodulated track of the common carrier frequency, which serves as a timing track, although there is also shown a method whereby the carrier frequency can be recovered from one or more of the tracks on which the samples are modulated. From the timing wave there are developed a plurality of trains of pulses which are phase-displaced or retarded in the same manner and to the same degree as the carriers on which the original signals were modulated. These trains of pulses are applied to sample the reproduced waves whose carriers have been retarded to substantially the same degree, and the samples are recombined in a common circuit to reconstitute substantially the original signal.

This broad description could also be applied to the reproducing apparatus of the present invention. The means employed to accomplish the result are, however, somewhat different and lead to a simpler, more economical apparatus, giving equally good or better results than that described in the prior application.

It will be apparent that if the desired result is to be achieved the samples of the reproduced waves must be taken almost exactly at the crest of the cycles of the modulated waves. Furthermore, they must be taken in exact time sequence, the samples uniformly spaced and not crowded together in some portions of the recording and spread apart in others. There are a number of factors which must be taken into account if this is to be accomplished. The phase of the reproduced waves must correspond precisely to the phases of the recorded waves or the crests of the reproduced waves must be substantially flat-topped so that slight variations in the phase of the sampling, with respect to the waves sampled, will make no appreciable difference in the instantaneous amplitude of the sample. If the recording and reproduction are accomplished on different equipment the alinement of the recording and reproducing heads must be substantially identical. The speed of the recording medium must be almost perfectly uniform, or if not, means must be provided to compensate for such non-uniformity as does exist.

Absolute alinement of the transducing heads in recording and reproduction, and absolute uniformity of the speed of the medium can be approached but never achieved, although if sufficient precautions are taken in the design and operation of the equipment used absolute accuracy can at least theoretically be approached to within any limits of error which may be set. As the requirement for accuracy becomes more and more severe the complexity, cost, and difficulty of maintenance increase disproportionately to the improvement achieved.

The primary object of the present invention is to provide means to eliminate the effect of small deviations in transducer alinement and speed of the recording medium, particularly, as to the latter, the cyclic variations which are referred to as "wow" in sound recording. Further objects of the invention are to accomplish the above result with simplified apparatus, apparatus that requires a minimum of initial adjustment and ultimate maintenance and which will, accordingly, throughout the useful life of the apparatus give improved results at lower expense.

In accordance with the inventor's prior disclosures the peak values of the positive and negative halves of the various modulated carrier waves are separately stored in "memory condensers" for periods in excess of the indeterminacy in relative phase, charges thus stored are sampled at a later time in proper timing sequence. In accordance with the present invention the same ultimate effect is obtained by somewhat different means. In the present instance the various modulated carriers are first completely demodulated or detected so as to develop a wave representing their respective envelopes, with the carrier frequency and its higher harmonics removed, and the resultant, unidirectional wave is then sampled, by unidirectional pulses, to yield the desired output samples which are then combined in sequence in the same manner as described in the prior application.

All the above will be more clearly understood by reference to the ensuing detailed descriptions of embodiments of the present invention, taken in connection with the accompanying drawings wherein.

Figure 1:
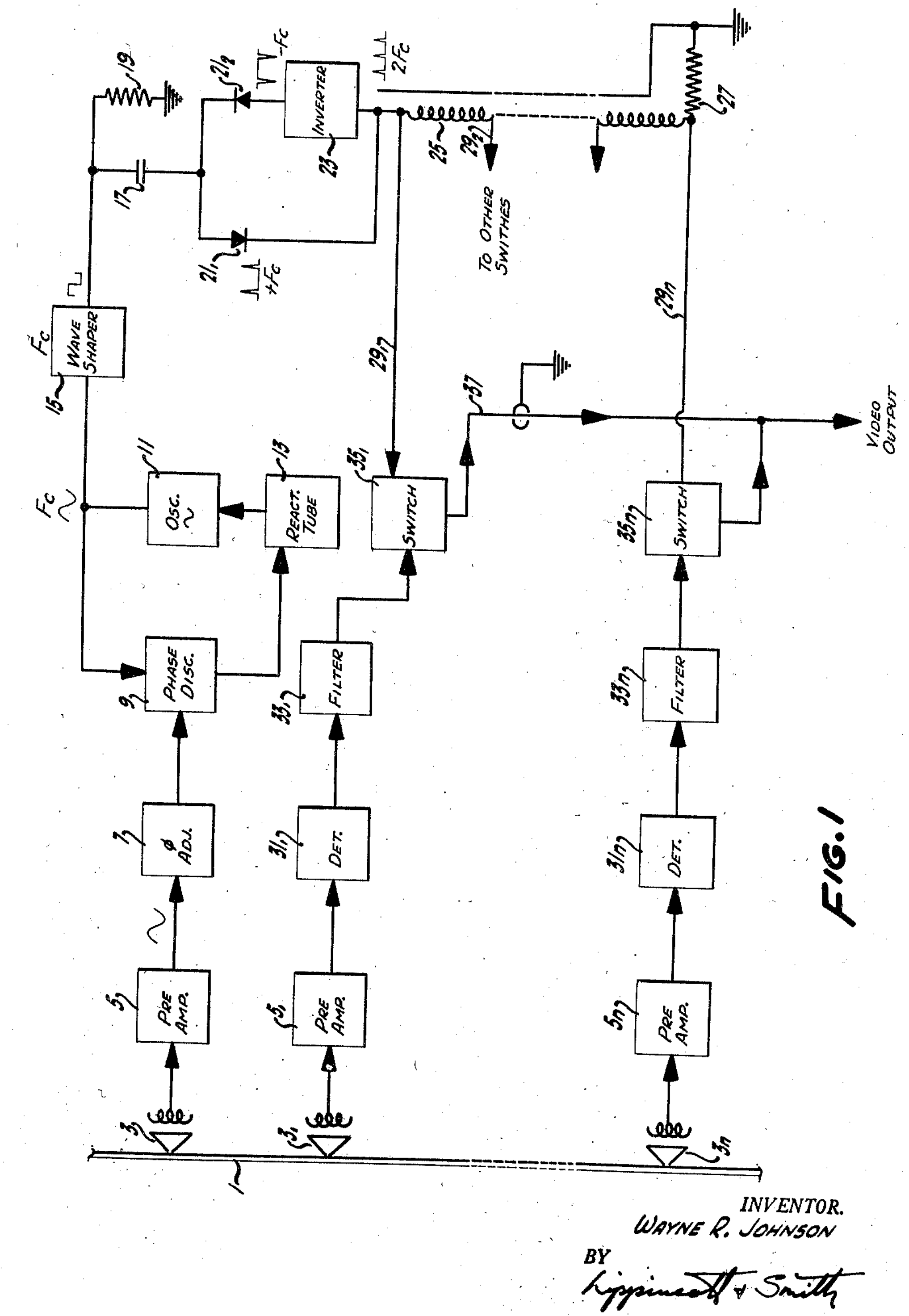
Fig. 1 is a diagram, largely in block form, of a television signal reproducer embodying the present invention.

Considering first Fig. 1, this drawing represents, in simplified and largely in block form, the essential elements involved in the present invention. In this showing the reference character 1 designates a cross-section of the magnetic tape or other recording medium on which the video signal is recorded as a plurality of parallel tracks. As has been explained in the above identified applications, these tracks may have substantially a sine waveform insofar as each individual half-cycle is concerned, the peak value of the positive and negative crests as recorded on any one track being proportional to the values of non-successive samples of the video wave, successive samples of this wave being recorded on successive tracks and the phases of the waves on the various tracks being relatively displaced by like intervals so that collectively the tracks represent a continuous sampling of the wave to be recorded. Each track therefore represents a modulated wave of a common carrier frequency which is a subharmonic of the sampling rate, each cycle of the carrier frequency carrying two samples, one on the positive and the other on the negative crests. In addition there is preferably recorded on the tape a timing wave of the common carrier frequency.

Apposed to the recording medium, so as to engage the various tracks, are a plurality of transducer heads equal in number to the tracks. A transducer head 3 engages the timing wave track, while the remaining heads, designated as $3_1$ to $3_n$, engage the various video tracks. Of these heads only heads $3_1$ and $3_n$ are shown, it being understood that any number may be used, depending upon the speed of the recording medium, the size of the recording gap in the heads and the maximum frequency which it is desired to record and reproduce.

Each of the transducer heads supplies a pre-amplifier, the timing head connecting to pre-amplifier 5 and the video heads connecting to amplifiers $5_1$ to $5_n$ inclusive. These amplifiers may be of any accepted type that will pass the carrier frequency plus the sidebands modulated upon it. Because of the method of sampling, none of these sidebands is of very high frequency and there is no D. C. component in the signals picked up by the heads. These pre-amplifiers can therefore be resistance-capacitance coupled and can cut off, on the high frequency end of the spectrum, at or somewhat below double the carrier frequency without losing any of the information conveyed. All of the pre-amplifiers can therefore be of substantially conventional type.

The timing wave from pre-amplifier 5 is supplied through a phase-adjusting device 7 to a phase discriminator 9. The phase shifting network may, for example, be of the type illustrated in "Waveforms," vol. 19 of the Radiation Laboratory Series, McGraw-Hill, 1949, at page 493. Various other types are available. Several types of circuits applicable to the purpose of the phase discriminator 9 are illustrated in the same work at page 358 and following. A well known type of such discriminator is employed for locking-in the line frequency sweep circuit in many television receivers, being utilized for this purpose in substantially the same manner as that here shown.

A second wave of the same nominal frequency as that of the timing wave is supplied to the discriminator 9 from an oscillator 11. The output of the discriminator 9 is a direct voltage which biases a reactance tube 13, which is included in the frequency determining or tank circuit of the oscillator 11. The effect of this arrangement is to maintain the average frequency of the oscillator constant at the average frequency of the timing wave, but to give a wave which is free from short-period variation in frequency such as might be caused by "flutter" or "wow" as recorded on the tape.

The output of the oscillator 11 is supplied to a wave shaper 15, which converts the substantially sine-wave output of the oscillator into a square waveform. One of the simplest and best known of such wave shapers comprises an overdriven amplifier, wherein the amplifier tube is driven beyond the linear portion of its characteristics curve and acts as a limiter, cutting off the peaks of the sine waves supplied to it and leaving only their substantially rectangular bases. Another well known form of square-wave generator is a bistable multivibrator, driven by the oscillator and synchronized thereby. The particular form employed is not material to this invention.

The square-wave output of the shaper 15 supplies a differentiating circuit comprising a small series condenser 17 and a shunt resistor 19, the time constant of the combination being short in comparison with the half-period of the carrier frequency, which develops from the square waves a series of short pulses, as is well understood. Following the differentiating network the circuit divides into two branches. Each branch includes a rectifier, designed as $21_1$ and $21_2$, which are oppositely poled so that one passes positive pulses and the other negative pulses only. The result in each branch is a train of pulses having a recurrence frequency $F_c$ equal to the fundamental of the timing wave, the pulses passed by the two circuits being displaced by 180° with respect to the frequency $F_c$. The negative pulses are fed to an inverter tube 23, the output of which is connected directly to the output side of rectifier $21_1$. As a result of this arrangement there appears, at the point of connection, a train of pulses, all of which are positive, having a recurrence rate of $2F_c$. These pulses supply a delay line 25, which may be of the well known type comprising a solenoidal coil wound on a suitable form and apposed thereon to a ground strip extending the length of the coil. The delay line is terminated by a resistance 27 having a value equal to the characteristic impedance of the delay line. The total delay of impulses passed to the line is $$\frac{P}{2}\times\frac{n-1}{n}$$

where P is the period of the frequency $F_c$ and $n$ is the number of tracks on which the video signals are recorded.

The delay line is tapped at equal intervals, starting at its input end and ending at the termination in the resistor 27, these taps connecting to leads $29_1$, $29_2$, etc. to lead $29_n$. A pulse passed by rectifier $21_1$ will therefore appear immediately at lead $29_1$. At lead $29_2$ it will appear at $1/n$th of a half-cycle later, and so on down to lead $29_n$. The next pulse, delivered from rectifier $21_2$, will appear at lead $29_1$, $1/n$th of a half-cycle after the preceding pulse has appeared at lead $29_n$. Considering the leads $29_1$ to $29_n$ collectively, a pulse will therefore appear on one or the other of these leads at uniform intervals of $$\frac{P}{2n}$$

throughout the operation of the device. These pulses are supplied to sampling switches which are connected to the circuits carrying the waves reproduced from the various tracks so as to sample the phase-displaced recorded waves in their proper order, as will next be described.

Each of the video channels, the elements of which are designated by the same reference characters distinguished by the subscripts 1 to $n$, comprises a transducer head 3 and pre-amplifier 5, as already described. The output of the pre-amplifier feeds a full-wave detector 31, and delivers to a filter 33 a wave which contains not only the desired information but components of double the common carrier frequency and the sidebands clustered about it as well as the upper sideband resulting from the original modulation. These, which for convenience may be referred to as the higher sidebands, are removed by the filter 33. Hence a wave which constitutes substantially the envelop of the modulation of the various carriers is supplied to the decoding switches 35.

These switches are actuated instantaneously and in succession by the sampling pulses supplied from the leads 29, connecting the various video channels successively to a common video output lead 37, for modulation upon a radio transmitter or transmission over a coaxial cable or other type of land-line.

Figure 2:
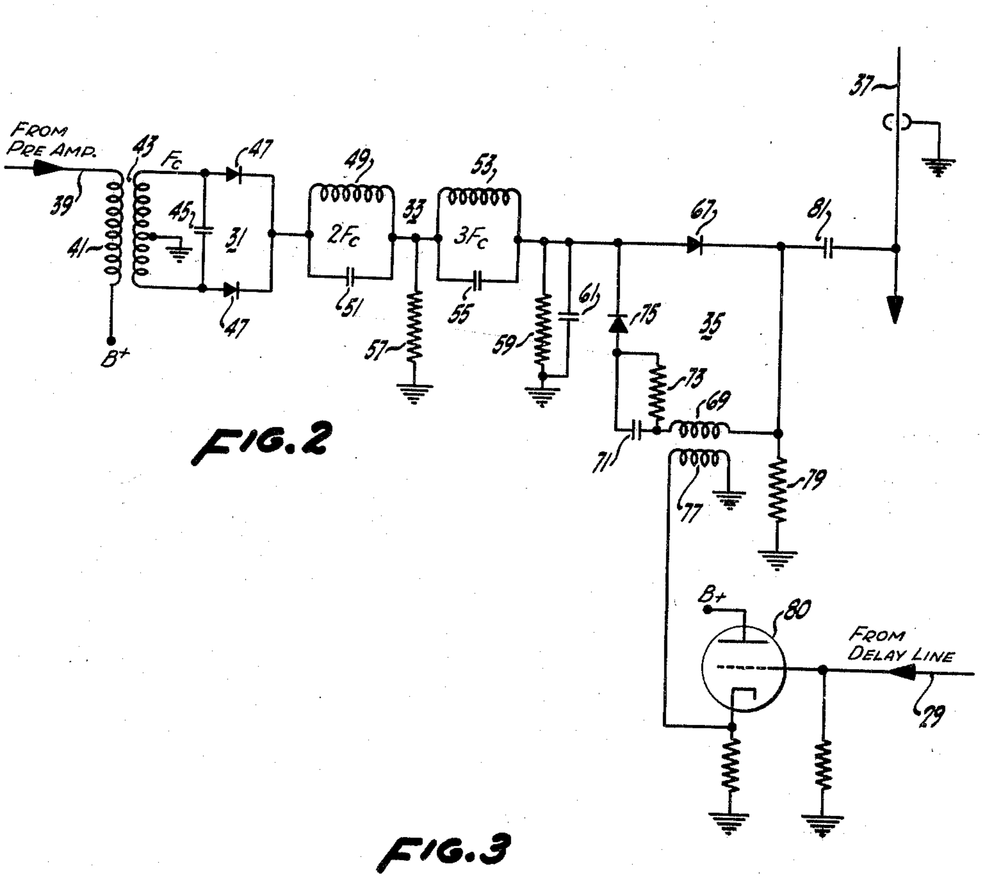
Fig. 2 is a schematic diagram illustrative of the circuitry employed in one embodiment of the invention.

The elements 31, 33 and 35 may take various forms. One such arrangement is illustrated in Fig. 2. Lead 39 connects to the plate circuit of the last tube of the preamplifier, and connects to the primary coil 41 of an air-core transformer. The secondary coil 43 of this transformer has a grounded center tap, and may be tuned to the carrier frequency by a condenser 45, although this is optional. The terminals of coil 43 connect to rectifiers 47, poled, in this case, to pass positive pulses only, and the output sides of the two rectifiers are connected together. It will be seen that this arrangement constitutes a conventional full-wave detector circuit, except for the fact that the customary by-pass condenser is not connected from the detector output to ground at this point.

The output of the detector feeds the filter 33. In its preferred form this filter comprises two sharply-tuned anti-resonant circuits, one comprising an inductance 49 and parallel condenser 51, resonating at a frequency of $2F_c$ or double the carrier frequency, the other, comprising inductor 53 and parallel condenser 55, resonating at a frequency of $3F_c$. A resistor 57 connects to ground from the junction between the two anti-resonant circuits, and a second resistor 59 similarly connects to ground from the output side of the second of these two circuits. Resistor 59 is shunted by very small by-pass condenser 61. The order in which these two anti-resonant circuits are connected is immaterial, and that tuned to the third harmonic, $3F_c$, is not strictly necessary although it improves the operation.

A detector-filter arrangement of this character follows the envelope of the modulated wave very closely. Because of the delay of the wave passing through the filter, the latter can "anticipate" at the crest of one cycle what the crest value of the next half cycle will be.

Figure 3:
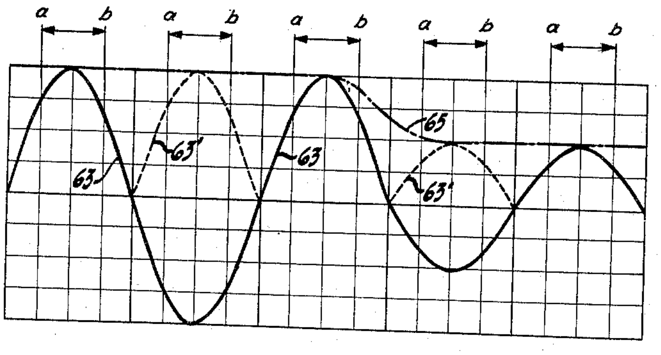
Fig. 3 is a group of characteristic waveforms illustrative of one of the modulated waves as originally reproduced, the same wave as detected and the envelope thereof after removal of the higher modulation products.

As in the case of the prior invention disclosed in copending application Serial No. 272,083, the crest value of each half-cycle is effectively stored, pending arrival of the next half cycle, but, instead of being stored before rectification it is stored in the condensers of the anti-resonant circuits after rectification. The characteristic television signal contains large low frequency components, which result in the condition that the crests of successive half cycles of the various carrier waves do not usually differ very greatly in amplitude. The over-all effect is shown in greatly exaggerated form in Fig. 3, wherein curve 63 represents the modulated wave as picked up in one channel. For illustrative purposes it is assumed that the first three half-cycles represent samples of the video wave which are of equal amplitude, followed by equal two half-cycles of reduced amplitude. The detector 31 inverts successive half cycles, as shown by the dotted curves 63′. After passing through the filter 33 the resultant wave is of the form indicated by the curve 65, although it should be noted that the amplitude of this latter curve is not to the same scale as curve 63 and 63′. Let it be assumed that because of transducer misalinement or speed variations in the tape drive, there is such uncertainty as to the phase of the modulated wave that sampling may take place anywhere within the intervals *a–b* as indicated on the drawing with respect to each half-cycle. In the curve this amounts to an uncertainty of 90°, but in practice the uncertainty may be held within much closer limits than this. If the individual half-cycles were sampled directly, there could be a variation of as much as 30% in the amplitude of any sample as delivered to the common video circuit. With the present arrangement it will be seen that where successive half-cycles are of equal amplitude phase variation of the sampling will result in practically no error, while where there is a sharp difference in amplitude between successive half-cycles the error is very greatly reduced, and, in practice, becomes unnoticeable. Effectively the peak value of each half cycle has been stored, as in the apparatus described in the prior application, but the equipment necessary to secure this effect is greatly simplified.

The actual sampling process must, however, be somewhat different than that described in the prior application, since in the apparatus there disclosed the sampling and the reversals in sign of alternate half-cycles of the sampled wave are effected in the same process, while in the present case alternate half-cycles are reversed in phase first and the sampling occurs later in the switch 35. In the previously described device, therefore, the sampling pulses alternated in sign, whereas in the present instance the pulses themselves have been rectified as has been described above.

The particular sampling switch shown in Fig. 2 is a simple one of the diode type. The switch comprises a diode rectifier 67 in series with the output line from the detector and filter. Around this diode is connected a loop circuit comprising, in series, the secondary coil 69 of a pulse transformer, a condenser 71 bridged by a high-resistance leak 73, and a second diode 75, poled to pass current around the loop circuit in the same direction as diode 67. The secondary coil 69 is coupled with a primary coil 77, and is excited by pulses supplied by the delay line 25 through the lead 29 to a cathode follower tube 79. The pulses from the delay-line must exceed in amplitude the signals to be sampled, and must be of proper polarity to pass the rectifiers 67 and 75. As a result of the current passed around the loop circuit by these pulses condenser 71 charges to a voltage higher than that supplied by the detector circuit, so that, in the absence of the pulses, the diodes are so biased as to prevent the passage of current therethrough. The leak resistor 73 and condenser 71 are so chosen that the time-constant of the parallel combination formed thereby is long in comparison with the interval between pulses. The charge on the condenser 71 therefore effectively supplies back bias on the two rectifiers which prevents flow of current through them and opens the switch. The occurrence of the pulse removes this bias and current can therefore flow from the detector circuit through rectifier 67, causing a voltage drop across resistor 79 to ground. The drop across resistor 79 appears as a voltage across a blocking condenser 81 and thence passes to the video circuit 37.

It will be realized that because of the presence of condensers 81 in each of the sampling channels the D. C. component of the video signal is not present in the circuit 37. The D. C. component is restored before the transmission of the signal by a conventional D. C. restorer circuit, such as is used in all conventional television receivers.

It will be appreciated that the actual circuitry illustrated in the figures is subject to a great deal of variation in detail. There are, for example, numerous well known full-wave detector circuits, any one of which may be employed in lieu of that specifically shown. The various rectifiers are illustrated as of the contact type, such as germanium crystals, but it is obvious that thermionic diodes, triodes, or more complex devices can be used instead. Numerous electronics switches are illustrated in "Waveforms," cited supra, which may be substituted for the switch 35. Furthermore, more elaborate filters may be substituted for the filter 33 illustrated; they must, of course, be of the low-pass type in order to pass the D. C. component of the envelop and should also pass the common carrier frequency substantially unattenuated. Various other forms of apparatus are available for developing the sampling pulses of double carrier frequency.

The specific equipment illustrated is therefore intended to be illustrative only, and not as limiting the scope of the following claims.

What is claimed is as follows:

1. In apparatus for reproducing television and like signals recorded as a plurality of tracks each representative of a modulated wave of a common carrier frequency, the carrier waves on which are modulated the signals recorded on the respective tracks being successively retarded in phase by substantially uniform increments so that considered collectively positive or negative peak values are recorded at substantially uniform intervals in each period of said common frequency, the absolute magnitude of each of such peak values being representative of an instantaneous sample of the recorded signal taken at the epoch of the peak; decoding apparatus comprising a plurality of transducers for translating the signals recorded on each track into corresponding electrical waves, full-wave detector means connected respectively to each of said transducers, filter means connected to the output of each of said detector means for removing from the output of the respective detector means components of double the carrier wave frequency and so provide trains of signals corresponding to the envelop of the modulation of the respective carrier waves, means for sampling said trains in succession for intervals of the order of magnitude of those used in sampling the original signal and in the same sequence with respect to the reproduced trains of energy, and a common circuit connected to receive the output of all of said sampling means.

2. In apparatus for reproducing television and like signals recorded as a plurality of tracks each representative of a modulated wave of a common carrier frequency, the carrier waves on which are modulated the signals recorded on the respective tracks being successively retarded in phase by substantially uniform increments so that considered collectively positive or negative peak values are recorded at substantially uniform intervals in each period of said common frequency, the absolute magnitude of each of such peak values being representative of an instantaneous sample of the recorded signal taken at the epoch of the peak; decoding apparatus comprising a plurality of transducers for translating the signals recorded on each track into corresponding electrical waves, demodulating means connected to each of said transducers, means connected to each of said demodulating means for removing from the output thereof upper-side-band frequencies developed in demodulation to provide trains of signals corresponding substantially to the envelopes of the respective carrier waves, means for sampling said trains in succession for intervals of the order of magnitude of those used in sampling the original signal and in the same sequence with respect to the reproduced trains of energy, and a common circuit connected to receive the output of all of said sampling means.

3. In apparatus for reproducing television and like signals recorded as a plurality of tracks each representative of a modulated wave of a common carrier frequency, the carrier waves on which are modulated the signals recorded on the respective tracks being successively retarded in phase by substantially uniform increments so that considered collectively positive or negative peak values are recorded at substantially uniform intervals in each period of said common frequency, the absolute magnitude of each of such peak values being representative of an instantaneous sample of the recorded signal taken at the epoch of the peak; decoding apparatus comprising a plurality of transducers for translating the signals recorded on each track into corresponding electrical waves, demodulating means connected respectively to each of said transducers, an output circuit connected respectively to each of said demodulating means, an anti-resonant circuit tuned to the second harmonic of said common carrier frequency connected in series in each said output circuit and a shunt impedance connected across each of said output circuits for removing second harmonic components of said common carrier frequency from the output of each of said demodulating means to provide trains of signals corresponding substantially to the envelop of the modulation of each of said carrier waves, means for sampling said trains in succession for intervals of the order of magnitude of those used in sampling the original signal and in the same sequence with respect to the reproduced trains of energy, and a common circuit connected to receive the output of all of said sampling means.

4. In apparatus for reproducing television and like signals recorded as a plurality of tracks each representative of a modulated wave of a common carrier frequency, the carrier waves on which are modulated the signals recorded on the respective tracks being successively retarded in phase by substantially uniform increments so that considered collectively positive or negative peak values are recorded at substantially uniform intervals in each period of said common frequency, the absolute magnitude of each of such peak values being representative of an instantaneous sample of the recorded signal taken at the epoch of the peak; decoding apparatus comprising a plurality of transducers for translating the signals recorded on each track into corresponding electrical waves, demodulating means connected respectively to each of said transducers, an output circuit connected respectively to each of said demodulating means, a plurality of anti-resonant circuits tuned respectively to successive harmonics of said common carrier frequency connected in series in each of said output circuits and shunt impedance elements bridged across each of said output circuits at the junctions of said anti-resonant circuits therewith for removing harmonic components of said common carrier frequency from the output of each of said demodulating means and so provide trains of signals corresponding substantially to the envelop of the modulation of each of said carrier waves, means for sampling said trains in succession for intervals of the order of magnitude of those used in sampling the original signal and in the same sequence with respect to the reproduced trains of energy, and a common circuit connected to receive the output of all of said sampling means.

5. In apparatus for reproducing television and like signals recorded as a plurality of tracks each representative of a modulated wave of a common carrier frequency, the carrier waves on which are modulated the signals recorded on the respective tracks being successively retarded in phase by substantially uniform increments so that considered collectively positive or negative peak values are recorded at substantially uniform intervals in each period of said common frequency, the absolute magnitude of each of such peak values being representative of an instantaneous sample of the recorded signal taken at the epoch of the peak; decoding apparatus comprising a plurality of transducers for translating the signals recorded on each track into corresponding electrical waves, demodulating means connected to each of said transducers, means connected to each of said demodulating means for removing from the output thereof upper-side-band frequencies developed in demodulation to provide trains of signals corresponding substantially to the envelopes of the respective carrier waves, means for producing a plurality of trains of unidirectional pulses having a recurrance rate equal to said common carrier frequency, the respective pulse trains being relatively phase-retarded by amounts substantially equal to the relative phase retardation of the respective carrier waves in recordation, a common video circuit, pulse actuated switching means connecting each of said output circuits to said common video circuit, and connections for supplying to each of said switching means the train of pulses corresponding in phase relation to the carrier wave on which the signal delivered to the output circuit connected by such switching means was modulated.

6. In apparatus for reproducing television and like signals recorded as a plurality of tracks each representative of a modulated wave of a common carrier frequency, the carrier waves on which are modulated the signals recorded on the respective tracks being successively retarded in phase by substantially uniform increments so that considered collectively positive or negative peak values are recorded at substantially uniform intervals in each period of said common frequency, the absolute magnitude of each of such peak values being representative of an instantaneous sample of the recorded signal taken at the epoch of the peak; decoding apparatus comprising a plurality of transducers for translating the signals recorded on each track into corresponding electrical waves, demodulating means connected to each of said transducers, means connected to each of said demodulating means for removing from the output thereof upper-side-band frequencies developed in demodulation to provide trains of signals corresponding substantially to the envelopes of the respective carrier waves, means for developing a train of unidirectional pulses having a recurrence rate equal to said common carrier frequency, a delay-line supplied by said pulse-developing means and tapped at intervals such that pulses transmitted along said line are retarded in phase in their arrival at successive taps by increments substantially equal to the relative phase retardation of the carrier waves on which the signals recorded on the respective tracks are modulated, a common video circuit, pulse-actuated switching means connecting each of said output circuits to said video circuit and connections from each of said delay-line taps to the one of said switching means connecting the one of said output circuits in which is developed the signal originally modulated on the correspondingly phase-delayed carrier.

References Cited in the file of this patent

UNITED STATES PATENTS 2,694,748 Johnson ---------------- Nov. 16, 1954